United States Patent Office 3,299,166
Patented Jan. 17, 1967

3,299,166
HARDENING OF EPOXY RESIN BY MEANS OF CONDENSATION PRODUCTS OF AMINO-ALKOXYSILANES AND MONO-OXIRANE COMPOUNDS
Harold Garton Emblem, Grappenhall, Norman Albert Hurt, Lymm, and Stanley Arthur Trow, Salford, England, assignors to Philadelphia Quartz Company, Philadelphia, Pa., a corporation of Pennsylvania
No Drawing. Filed May 3, 1963, Ser. No. 277,707
Claims priority, application Great Britain, May 14, 1962, 18,505/62
3 Claims. (Cl. 260—824)

This invention relates to organic silicon materials.

According to the invention there is provided a useful class of organic silicon materials being condensation products of an oxirane compound having one oxirane group and an aminoalkoxy silane to the silicon atom of which is directly attached one or more alkyl, alkenyl or phenyl groups. The silane may also comprise bound to the silicon atom one or two alkoxy groups. The alkyl or alkenyl group may contain up to 5 carbon atoms. The silane may contain one, two or three alkyl, alkenyl or phenyl groups. The amino-substituted ester groups of the silane may be derived from an amino compound of the formula $R^1NHR^2$ where $R^1$ is a hydroxyalkyl group containing 1 to 6 carbon atoms, and $R^2$ is hydrogen or an alkyl or monohydroxyalkyl group containing 1 to 6 carbon atoms; preferably the number of hydroxyl groups of the amino compound does not exceed two. Typical of the aminoalkoxy groups are those derived from an amino compound of the above formula in which $R^1$ contains 2 to 4 carbon atoms and one hydroxyl group and $R^2$ is hydrogen or an alkyl or monohydroxyalkyl group with 1 to 4 carbon atoms.

Examples of the amino compounds from which aminoalkoxy groups of the silane may be derived are ethanolamine, 3-amino-propan-1-ol, N - methyl-ethanolamine, 2-amino-2-methyl-propan-1-ol and diethanolamine.

Examples of suitable aminoalkoxy silanes are those of the formula $$R_n^3Si(OR^4)_m(OR^5NHR^6)_{4-m-n}$$

where $R^3$ represents the phenyl group or an alkyl or alkenyl group having 1 to 5 carbon atoms; $R^4$ represents an alkyl group containing 1 to 4 carbon atoms; $R^5$ represents an alkylene or a monohydroxy alkylene radical having 1 to 6 carbon atoms; $R^6$ represents hydrogen or an alkyl or a monohydroxyalkyl group having 1 to 6 carbon atoms; $m$ has the value 0, 1 or 2; $n$ has the value 1, 2 or 3; and $m+n$ is equal to 1, 2 or 3.

The aminoalkoxy silane may be prepared by an interchange reaction between an alkyl (alkoxy) silane or a phenyl (alkoxy) silane and the appropriate aminoalcohol so as to replace some or all of the alkoxy groups by aminoalkoxy groups.

The preferred oxirane compounds are the mono-oxirane aliphatic compounds containing up to 6 carbon atoms, and styrene oxide. Mixtures of oxirane compounds may be used. Examples of such aliphatic oxirane compounds are those of the formula

where $R^7$ and $R^8$, which may be the same or different, represent hydrogen, or alkyl groups or hydroxy- or allyloxy-substituted alkyl groups. Examples of suitable oxirane compounds are ethylene oxide, 1:2-propylene oxide, 1:2-butylene oxide, glycidol, allyl glycidyl ether, and styrene oxide.

The oxirane compound and the aminoalkoxy silane may be condensed together in various proportions. A suitable amount of oxirane compound is such as to provide in the reaction mixture 0.5 or more, and preferably at least 1, oxirane group per active amino hydrogen atom of the aminoalkoxy silane.

The oxirane compound and the aminoalkoxy silane may be condensed together by heating a mixture of these reactants. The condensation may be effected under an inert atmosphere and under pressure if necessary.

The condensation products of the invention have a number of uses. The products are heat-hardenable and can be used for example to form surface coatings. They are particularly suitable for applying anti-corrosion primer and stoving finish coatings to metal surfaces.

The products can also be used to harden epoxy resins. For this purpose about 0.3 to 2.5 parts by weight of the product and 1 part by weight of an epoxy resin are mixed together and hardened by applying heat. Suitable temperatures are from 140–250° C. and suitable stoving times are 1 to 5 hours. To get the best results temperatures of about 170° C. or higher and stoving times of at least 1½ hours are to be used. A feature of the use of the products of the invention for hardening epoxy resins is that hardened resins having good heat stability are obtained. With the usual aliphatic amine catalysts, cured resin films often show defects on prolonged heating at around 170° C. Aromatic amine catalysts usually possess toxic properties.

Many of the products of the invention are soluble in water. Thus products prepared from a silane of the above formula in which $n=1$ are water soluble and from such solutions surface coatings can be produced by curing a film of the applied solution. The preferred water soluble compounds are those prepared by condensing together a silane of the above formula in which $n=1$ and 1:2-butylene oxide. To the solutions may be added pigments, the pigmented solution giving a hard paint film on stoving. The solutions are valuable for applying, for example, anti-corrosion coating and stoving finishes to metal surfaces.

The condensation products of the invention are hydoxyl compounds, a hydroxyl group being produced by the reaction between the oxirane group and the amino group. Thus 1:2 butylene oxide will react with, for example, dimethyl di-(2-aminoethoxy) silane in accordance with the following reaction scheme:

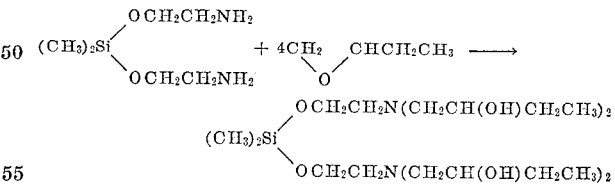

The oxirane compound may also react with the hydroxyl group formed by a previous condensation with amino-hydrogen, or with a hydroxyl group already present in the aminoalkoxy silane.

The condensation products of the invention may be reacted with mono- or poly-isocyanates, for example tolylene diisocyanate, hexamethylene diisocyanate, phenyl isocyanate, to produce isocyanate resins having isocyanate or hydroxy terminal groups. These reaction products can be heat cured alone or with each other or with other polyols or polyisocyanates to give surface coatings of good adhesion. The polymers may be chain blocked by addition of simple isocyanates, e.g. phenyl isocyanate, with hydroxyl-ended products, and by the addition of hydroxy compounds, e.g. phenol or ethanol, with isocyanate-ended products.

The following examples illustrate the invention. The epoxy resin referred to in various of the examples was a reaction product of 2,2-bis(4-hydroxy phenyl) propane, derived from acetone and phenol, and epichlorhydrin; the resin had an epoxide equivalent weight of 175–210 and a hydroxyl equivalent weight of 85.

EXAMPLE 1

Methyl tri-(2-aminoethoxy) silane (20 g.) was heated to 130° C. under a nitrogen atmosphere, and 39.8 g. of 1:2-butylene oxide (equivalent to 2 mols of oxide per $NH_2$ group of the silane) were added dropwise with stirring over 90 minutes, the temperature of the mixture being maintained at 130° C. To complete the reaction, the mixture was held at 130° C. for a further 2 hours. The product was a clear colourless liquid.

The product when coated on a glass plate and heated for about 2½ hours at 140° C. gave a flexible film having good adhesion.

A solution of the product in water (30% w./w.) was stable, and when coated on a glass plate gave a transparent coating on heating at 140° C.

EXAMPLE 2

By the method described in Example 1, methyl tri-(2-aminoethoxy) silane and 1:2-propylene oxide (in a molar ratio of 1:3) were condensed together. The product was a clear, colourless viscous liquid which was soluble in water.

When coated on a glass plate and heated for about 1½ hours at 140° C. the condensation product gave a flexible film having a good adhesion.

EXAMPLE 3

By the method described in Example 1, methyl tri-(3-aminopropoxy) silane and 1:2-propylene oxide (in a molar ratio of 1:3) were condensed together. The product was a clear, colourless viscous liquid which was soluble in water.

When coated on a glass plate and heated for about 1½ hours at 140° C. the product gave a flexible film having good adhesion.

EXAMPLE 4

By the method described in Example 1, methyl tri-(2-aminoethoxy) silane and 1:2-butylene oxide (in a molar ratio of 1:3) were condensed together. The product was a clear, colourless, viscous liquid which was soluble in water.

When coated on a glass plate and heated for about 1½ hours at 140° C. the product gave a flexible film having good adhesion. The film was improved by mixing with the product, prior to heating, two thirds of its weight of dicyclopentadiene dioxide.

EXAMPLE 5

Dimethyl diethoxy silane (70 g.) and monoethanolamine (112 g.) (molar ratio 1:3) were refluxed for 1½ hours under nitrogen, with 0.7 g. of sodium as catalyst for the interchange. The liberated ethanol was removed using a small fractionating column. The total distillate recovered was 45.5 g. (theory 43.2 g.). The product was fractionated at 10 mm. mercury pressure, giving a fraction boiling at 73° C., weight 76.5 g., which was excess ethanolamine, and another fraction boiling point 104–105° C., $n_D^{20}=1.441$, weight 56 g., which was dimethyl di-(2-aminoethoxy) silane.

The dimethyl di-(2-aminoethoxy) silane was then reacted with 1:2-butylene oxide in the following manner. 30 g. of the dimethyl di-(2-aminoethoxy) silane was heated to 125° C., under a nitrogen atmosphere, with stirring, and 25.5 g. of 1:2-butylene oxide added in the course of one hour, the reaction temperature being maintained at 125–130° C. The mixture was maintained at this temperature for a further two hours. Any volatile material remaining was removed by heating the product for 30 minutes at 100° C., under 1 mm. Hg pressure. The reaction product was a clear colourless liquid insoluble in cold water.

A mixture of equal parts by weight of the product and an epoxy resin reacted at 140° C. to give a film having good adhesion to glass.

EXAMPLE 6

25 g. of dimethyl di-(2-aminoethoxy) silane (prepared as described in Example 5) were heated to 125° C. under an atmosphere of nitrogen, and 20.9 g. of 1:2-butylene oxide added slowly during 30 minutes. After an initial heat evolution, the mixture refluxed steadily at 105° C. The volatile material was distilled off after 3½ hours refluxing. The weight of non-volatile product was 33 g. The temperature was raised to 135° C. and a further 50.9 g. of 1:2-butylene oxide added in the course of 1½ hours, the temperature being maintained at 135–140° C. To complete the reaction, the mixture was maintained at 135–140° C. for a further 30 minutes, and any volatile material removed by heating at 100° C. under 1 mm. Hg pressure for 30 minutes. The reaction product was a clear colourless viscous liquid sparingly soluble in cold water, dissolving easier in warm water.

A mixture of equal parts by weight of the product with an epoxy resin reacted at 140° C. to give a film having good adhesion to glass.

EXAMPLE 7

Dimethyl diethoxy silane (50 g.) and diethanolamine (49.5 g.) (molar ratio 5:7) were refluxed under dry nitrogen for one hour. 1.0 g. of sodium methoxide was then added, and liberated ethanol distilled off using a small fractionating column. 29.7 g. of distillate were recovered. Further volatile matter (9.5 g.) was removed by heating for one hour at a temperature of 100° C. under a pressure of 3 mm. Hg. The product was treated for one hour at 100° C. with 2.5 g. of activated carbon, then filtered, giving a clear colourless liquid.

34.7 g. of this product were heated to 150° C. under nitrogen, and 17 g. of 1:2-butylene oxide added in the course of 30 minutes. The mixture was heated at 150° C. for 1½ hours to complete the reaction, then filtered through a bed of "Dicalite" filter aid. The product was a clear pale yellow liquid.

Equal parts by weight of this product and an epoxy resin when heated to 140° C. reacted to give a flexible film having good adhesion to glass.

EXAMPLE 8

25 g. of dimethyl di-(2-aminoethoxy) silane were heated to 130° C. under nitrogen with stirring, and a mixture of 3.2 g. of allyl glycidyl ether and 16.16 g. of 1:2-butylene oxide added over one hour, the temperature being maintained at 130±2° C. After 35 minutes, the temperature rose rapidly to 170° C. The addition was stopped and the charge quickly cooled to 130° C., when the addition was continued 5 minutes later. On completion of the addition, the material was heated under nitrogen at 130–140° C. for a further 30 minutes to complete the reaction. The product was a pale yellow mobile liquid.

EXAMPLE 9

A mixture of ethyl triethoxy silane (50 g.) and monoethanolamine (64.6 g.) was refluxed for 30 minutes, and the ethanol liberated was removed by fractional distillation, 34.0 g. being recovered. The crude ethyl tri-(2-aminoethoxy)silane was fractionally distilled, the fraction boiling at 160° C. at 11 mm. Hg pressure, being pure ethyl tri-(2-aminoethoxy) silane. Equivalent weight found=78.6, required 79.

28.1 g. of the ethyl tri-(2-aminoethoxy) silane were heated to 125. C., under nitrogen, and 51.2 g. of 1:2-butylene oxide added with stirring over three hours, the temperature being maintained at 125–130° C. At the end of the addition the temperature was maintained at 125–130° C. for a further two hours, and any unreacted material removed by heating the product for ¾ hour at 125–130° C. under a pressure of 13 mm. Hg. The product was a clear colourless viscous liquid. Equivalent weight found=218, required 223.

EXAMPLE 10

15.6 g. of methyl tri-(N-methyl 2-aminoethoxy) silane were heated to 125° C., under nitrogen, and 12.7 g. of 1:2-butylene oxide added over 1½ hours, the temperature being maintained at 125–130° C. The mixture was kept at 125–130° C. for a further 1½ hours. The product was heated to 100° C. at 1 mm. Hg. pressure for ¾ hour.

EXAMPLE 11

30 g. of dimethyl di-(N-methyl 2-aminoethoxy) silane was heated to 125° C. with stirring, under nitrogen, and 20.97 g. of 1:2-butylene oxide added over 2 hours, the temperature being maintained at 125–130° C. The mixture was stirred at 125–130° C. for a further 1½ hours. The product was heated to 100° C. at 2 mm. Hg pressure for ¾ hour to remove any volatile material.

EXAMPLE 12

Vinyl triethoxy silane (57 g., 0.3 mole) and monoethanolamine (54.9 g., 0.9 mole) were refluxed under nitrogen for 30 minutes. The theoretical amount of ethyl alcohol was then removed by distillation, using a factionating column, to give, as the reaction product, vinyl tri-(2-aminoethoxy) silane.

11.2 g. of vinyl tri-(2-aminoethoxy) silane and 17.15 g. of styrene oxide were reacted by dissolving the vinyl tri-(2-aminoethoxy) silane in 5 ml. of toluene, heating under nitrogen to 142° C., and adding the styrene oxide, dissolved in 5 ml. of toluene, slowly in the course of 45 minutes, the temperature being maintained at 130° C. during the addition. The reaction was completed by heating for one hour at 130° C. The toluene was removed by heating at 120° C. for 45 minutes, at 20 mm. Hg pressure under a nitrogen atmosphere, to give the reaction product of vinyl tri-(2-aminoethoxy) silane and styrene oxide as a viscous yellow material.

A solution of 28.35 g. of the reaction product in 10 ml. of toluene and an epoxy resin were reacted as follows. 1 part by weight of resin and 1.9 parts by weight of the toluene solution were mixed, and the resulting solution coated on glass slides, and hardened at 140°–160° C. for 1½ to 2½ hours.

EXAMPLE 13

Vinyl tri-(2-aminoethoxy) silane (15.6 g.) and 1:2-butylene oxide (14.8 g.) were reacted by adding the butylene oxide dropwise in the space of ½ hour to the vinyl tri-(2-aminoethoxy) silane heated to 140° C. under nitrogen. The reaction was completed by maintaining the mixture at 135–140° C. for a further 1½ hours.

To test the reaction product as an epoxy resin hardening agent, the following mixtures with an epoxy resin were made.

| Mixture | Parts by weight of reaction product | Parts by weight of epoxy resin |
|---|---|---|
| A | 1 | 1 |
| B | 1 | 1.5 |
| C | 1 | 2 |

The mixtures were thinned with dry benzene, coated on glass slides and then baked at 220° C. for 2 hours. Each mixture gave hard, tack-free clear films.

EXAMPLE 14

Phenyl triethoxy silane (75 g.) and 1-amino-propan-3-ol (70 g.) were refluxed for one hour, after which the theoretical quantity of ethyl alcohol was removed, using a fractionating column. On distillation under vacuum two fractions were obtained; a fraction having a boiling point range of 160–165° C. at 0.35 mm. Hg and a second fraction having a boiling point range of 187–189° C. at 0.40 mm. Hg. This second fraction had an equivalent weight of 113.4 (PhSi(O.CH$_2$CH$_2$CH$_2$NH$_2$)$_3$ requires 109).

Phenyl tri-(3-aminopropoxy)silane (30 g.) and 1:2-propylene oxide (16 g.) were reacted by adding the propylene oxide dropwise to the silane, which was heated to 140° C. The addition took 1½ hours. Care was necessary as the reaction is very exothermic. The reaction mixture was maintained at 135°–140° C. for a further hour, then evacuated to 0.5 mm. Hg for ½ hour to remove volatile matter. The whole process was carried out under a nitrogen atmosphere.

The reaction product produced was then tested as a hardening agent for an epoxy resin. The following mixtures of the reaction product in the resin were prepared:

| Mixture | Parts by weight of reaction product | Parts by weight of epoxy resin |
|---|---|---|
| D | 1 | 1 |
| E | 3 | 5 |

Mixture D was coated on a glass slide and stoved at 200° C. for 4 hours. A hard yellow film having good adherence was produced. It was resistant to N/2 hydrochloric acid solution for at least 15 hours.

Mixture E was similarly tested although in this case the stoving temperature was 200–220° C. and the stoving time 2½ hours. A hard resin film having the same properties as that obtained from mixture D was produced.

EXAMPLE 15

10.34 g. of ethyl triethoxy silane and 8.77 g. of monoethanolamine were reacted by warming the mixture until it was homogenous, then distilling off the liberated ethanol. The theoretical amount was recovered. To the resulting ethyl tri-(2-aminoethoxy)silane, 10.2 g. of 1:2-butylene oxide were added. The mixture was warmed on a water bath to start the reaction. During the reaction the temperature rose to 120° C. The product, on cooling, was a clear amber yellow oil soluble in its own volume of water, giving a clear homogenous solution. This solution, when applied to glass, gave a clear flexible film on stoving at 140° C.

This aqueous solution was pigmented with titania pigment to give a white paint. On painting glass and metal surfaces, and stoving at 140° C. a paint film was obtained which adhered well to the surfaces of both the glass and the metal.

EXAMPLE 16

Phenyl triethoxy silane (72 g., 0.3 mole) and distilled monoethanolamine (36.6 g., 0.6 mole) were reacted in the following manner.

The phenyl triethoxy silane was heated to 150° C. and half the monoethanolamine added dropwise over 20 minutes, the temperature being maintained at 150° C. The remainder of the monoethanolamine was added dropwise over 10 minutes, the temperature being allowed to fall to 130° C. during this time. The mixture was maintained at 130° C. for a further 15 minutes, after which the ethanol was removed by distillation. 79.6 g. of material remained in the flask after distillation of the ethanol (theory 81 g.). The material remaining in the flask was phenyl(ethoxy)di-(2-aminoethoxy)silane.

40.5 g. of the phenyl(ethoxy)di-(2-aminoethoxy)silane were reacted with a mixture of 1:2-propylene oxide (8.7 g., 0.15 mole) and 1:2-butylene oxide (10.8 g., 0.15 mole) by adding the epoxides to the silane, heated to 135° C., in the course of 30 minutes, the mixture being maintained at 135° C. for a further hour to complete the reaction. The reaction product was a pale yellow oil.

To test the reaction product as an epoxy resin hardening agent, mixtures with an epoxy resin were made, applied as thin films to glass slides and stoved at 150° C.

| Mixture | Parts by weight of reaction product | Parts by weight of epoxy resin | Stoving time |
|---|---|---|---|
| F | 1 | 1 | 1 hour. |
| G | 0.5 | 1 | 2 hours. |
| H | 2 | 1 | 2 hours. |

Each of the mixtures gave hard films.

EXAMPLE 17

Equal parts by weight of the reaction product of Example 3 and an epoxy resin were mixed, and the mixture thinned with cyclohexanone to a viscosity of approximately 3 poises, then applied to plate glass at a wet film thickness of 0.002 inch. The panel was then stoved for two hours at 170° C., a clear glossy film being obtained. The coated panel was then half immersed in water for 24 hours in order to assess water sensitivity. The sample was completely unaffected by the immersion in water.

EXAMPLE 18

44.6 g. of tolylene diisocyanate was dissolved in 20 ml. of ethyl acetate and cooled to 12° C. The solution was stirred while 25 g. of the condensation product of Example 6 was added over a period of 1 hour, the temperature being maintained at 10–15° C. The solution was stirred at 10–15° C. for a further ½ hour, and finally at 20–25° C. for 2½ hours. A further 50 ml. of ethyl acetate was then added. The resultant product when coated on glass and heated to 90° C. for 1 hour gave a rigid coating with good adhesion.

EXAMPLE 19

2.465 g. of diethylene glycol and 25 g. of the product of Example 18 were heated to 50° C. with stirring for 30 minutes. The resultant product when coated on glass and heat cured at 100° C. for 20 minutes gave a flexible coating with good adhesion.

EXAMPLE 20

To 20 g. of the condensation product of Example 11 was added 13.54 g. of tolylene diisocyanate over ½ hour, with stirring, the temperature being maintained at 25° C. by means of an ice bath. The product was very viscous. 33.54 g. of ethyl acetate was added and stirring continued at 25° C. for a further 1 hour. The product when coated on glass and heated to 100° C. for 1¾ hours gave a flexible film with good adhesion.

EXAMPLE 21

To a mixture consisting of 21 g. of the condensation product of Example 3 and 6.41 g. of the condensation product of Example 10 was added 10.5 g. of tolylene diisocyanate over 40 minutes, the temperature being maintained at 60° C. by the heat of reaction. The mixture was stirred for a further ½ hour, the temperature dropping to 48° C. To the viscous product was added 19 g. of ethyl acetate and stirred for 10 minutes until dissolved. The solution was cooled to room temperature. The product when coated on glass and heated at 140° C. for 3½ hours gave a flexible film with good adhesion.

EXAMPLE 22

To a solution of 7.5 g. of the condensation product of Example 3 and 0.42 g. of phenol in 10 g. of ethyl acetate was added 4.15 g. of tolylene diisocyanate over 1 hour, with stirring, the temperature being maintained at 25° C. The solution was stirred at 25° C. for a further 1 hour. On coating on glass and heating at 100° C. for 2 hours, a flexible coating of good adhesion was obtained.

What is claimed is:

1. A method of hardening an epoxy resin comprising the reaction product of epichlorohydrin and 2,2-bis(4-hydroxy phenyl)propane which comprises:
   (a) forming a mixture of 1 part by weight of said epoxy resin and about 0.3 to 2.5 parts by weight of a condensation product of an aminoalkoxy silane and a monooxirane compound, said aminoalkoxy silane having the formula:

   $$R_n^3Si(OR^4)_m(OR^5NHR^6)_{4-m-n}$$

wherein
   $R^3$ is selected from the class consisting of alkyl and alkenyl groups having up to 5 carbon atoms, and the phenyl group;
   $R^4$ is an alkyl group having up to 4 carbon atoms;
   $R^5$ is selected from the class consisting of alkylene and monohydroxyalkylene radicals having up to 6 carbon atoms;
   $R^6$ is selected from the class consisting of hydrogen, alkyl and monohydroxyalkyl groups having up to 6 carbon atoms;
   $n$ is selected from the values 1, 2 and 3;
   $m$ is selected from the values 0, 1 and 2; and
   $n+m$ is selected from the values 1, 2 and 3;
   and said oxirane compound is one selected from the class consisting of aliphatic compounds containing up to 6 carbon atoms and styrene oxide, and
   (b) heating the mixture at a temperature of from 140° C. to 250° C. for from 1 to 5 hours.

2. A method as claimed in claim 1 wherein $m=0$ and $n$ is selected from the values 1 and 2.

3. A method as claimed in claim 1 wherein $m=0$, $n=1$, $R^3$ is a group selected from the class consisting of methyl and ethyl groups and the oxirane compound is 1:2-butylene oxide.

References Cited by the Examiner

UNITED STATES PATENTS

| 2,843,560 | 7/1958 | Mika | 260—824 |
| 2,885,419 | 5/1959 | Beinfest et al. | 260—448.8 |
| 3,110,601 | 11/1963 | Emblem et al. | 260—448.8 |

SAMUEL H. BLECH, *Primary Examiner.*